May 24, 1955
C. KELLER ET AL 2,708,883
ARRANGEMENT FOR USE IN RADIAL CENTRIFUGAL COMPRESSORS AND PUMPS FOR THE CONVERSION OF KINETIC ENERGY OF THE FLOWING MEDIUM INTO PRESSURE ENERGY
Filed Feb. 23, 1951
2 Sheets-Sheet 1
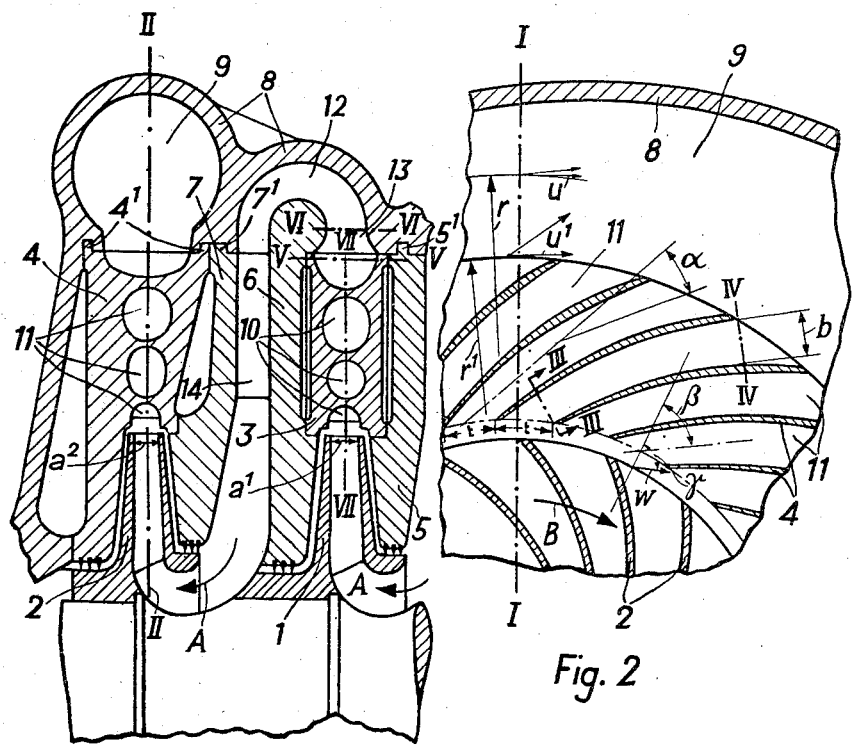
Fig. 1
Fig. 2
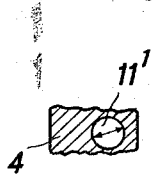
Fig. 3
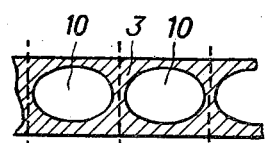
Fig. 5
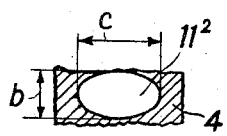
Fig. 4
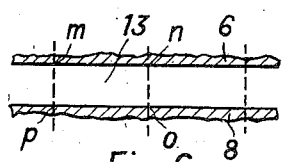
Fig. 6
Inventors
Curt Keller
and Fritz Salzmann
By Dodge
Attorneys May 24, 1955    C. KELLER ET AL    2,708,883
ARRANGEMENT FOR USE IN RADIAL CENTRIFUGAL COMPRESSORS
AND PUMPS FOR THE CONVERSION OF KINETIC ENERGY
OF THE FLOWING MEDIUM INTO PRESSURE ENERGY
Filed Feb. 23, 1951    2 Sheets-Sheet 2
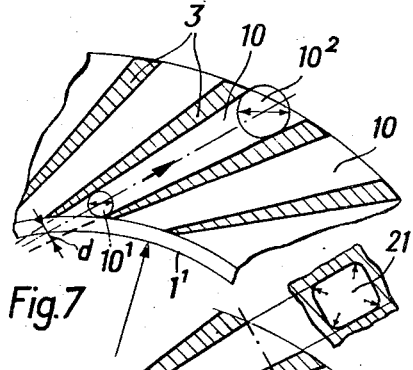
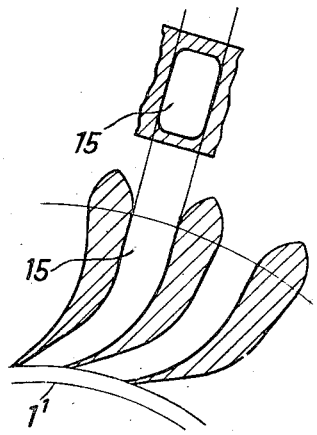
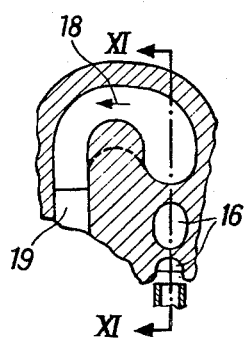
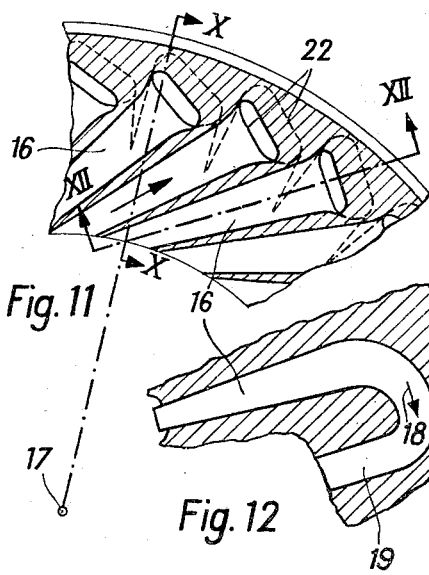
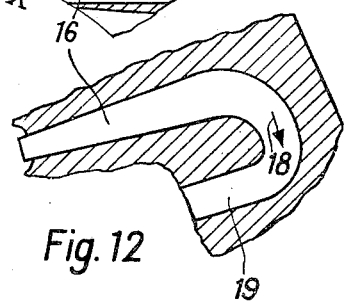
Inventors
Curt Keller
and Fritz Salzmann
By Dodge
               Attorneys

United States Patent Office 2,708,883
Patented May 24, 1955

2,708,883

ARRANGEMENT FOR USE IN RADIAL CENTRIFUGAL COMPRESSORS AND PUMPS FOR THE CONVERSION OF KINETIC ENERGY OF THE FLOWING MEDIUM INTO PRESSURE ENERGY

Curt Keller, Kusnacht, and Fritz Salzmann, Zurich, Switzerland, assignors to Escher Wyss Aktiengesellschaft, Zurich, Switzerland, a corporation of Switzerland Application February 23, 1951, Serial No. 212,298

Claims priority, application Switzerland March 3, 1950

13 Claims. (Cl. 103—108)

The invention relates to an arrangement for use in radial centrifugal compressors and pumps for the conversion of kinetic energy of the flowing medium into pressure energy, which comprises passages arranged next to the impeller and widening in the direction of flow.

In radial centrifugal compressors, hereinafter briefly referred to as "radial compressors," the kinetic energy with which the flowing medium leaves the impeller generally constitutes a relatively large proportion of the total work absorbed by the impeller. It is therefore important that this kinetic energy should as far as possible be converted into pressure energy with minimum losses.

For this purpose, the velocity energy has already been converted into pressure energy in bladed outlet guide assemblies. In such bladed guide assemblies, the flow channels are generally of rectangular form. However, the boundary layers on the abutting walls collect in the corners of such rectangular forms, which causes premature detachment of the flow in the regions in question and correlatively a reduction of the degree of conversion of the velocity energy into pressure. Furthermore, the passages of these guide assemblies generally widen only or mainly in one direction. Thus, if the passages must have a curvature the cross-sections of such passages, which assume rectangular form from the outset or at least in the course of the flow, are so oriented in relation to the curvature that the narrow side of the rectangle lies perpendicularly to the plane of curvature, the ratio of the sides of the rectangle increasing moreover in the course of the flow in the sense that the longitudinal side lying in the plane of curvature increases, which, as is known, detrimentally affects the course of the flow in the curvature.

It has furthermore been proposed to arrange individual component spirals next to the outlet of the impeller of a compressor and to extend these component spirals by diffusors having rectilinear axes and circular cross-section. Such an arrangement provides favorable conditions in the diffusors themselves, but the component spirals are somewhat long in relation to their internal diameter, especially in the case of narrow impellers and then cause, especially as they are situated at the points of greatest velocity, additional substantial losses apart from those occurring in the actual diffusors.

The object of the present invention is to avoid in an arrangement of the type referred to at the beginning the aforesaid disadvantages of the existing constructions, and to provide an arrangement in which the energy conversion aimed at can be effected with minimum losses and minimum dimensions, that is to say, with minimum expenditure of material. To this end, in an arrangement according to the invention the inlet cross-section of the individual retardation passages is of at least approximately circular form and has an area which is smaller than twice the area of the square formed with the internal outlet width of the associated impeller. Furthermore, the outlet cross-sectional area of the individual retardation passage is at least three times its inlet cross-sectional area.

In such an arrangement, the flow divided into component flows enters as rapidly as possible into passages of approximately circular form after leaving the impeller, so that the component flows pass through cross-sectional forms in which the circumference swept by the flow is a minimum in relation to the cross-sectional area. Due to the limitation of the inlet area of the individual passages to a maximum equal to twice the area of the square formed with the internal outlet width of the associated impeller, the flow is divided into so many component flows that component spirals in which the flowing medium must still travel at great speed along a path which is long in relation to its width and which thus cause a relatively great proportion of the friction losses, are not required for the delivery to the individual passages.

In an arrangement constructed in accordance with the invention, a greater number of passages are obtained when the width of the impeller is small than in the case of an impeller of great width, so that the narrow component spirals, which would be obtained with a small number of diffusor passages in the case of narrow impellers, are dispensed with.

With constructions of geometrical similitude, retardation passages of relatively small cross-sectional inlet area, the diameter of which is of the order of magnitude of the outlet width of the associated impeller, the possibility is also afforded of obtaining a considerable retardation of the flowing medium over a relatively short path. Consequently, even with considerable retardation of the flowing medium (cross-sectional outlet area of the passage greater than three times its cross-sectional inlet area), the retardation arrangement and consequently also the engine housing need only be of small dimensions. Especially when the working medium is at high pressure, this affords a two-fold saving of material in that both the diameter of the housing and the wall thickness necessary to take up a predetermined pressure for reasons of strength are reduced.

With regard to the flow, the advantage is also obtained that owing to the large number of passages the flowing medium is evenly distributed over the cross-sectional outlet area of the retardation arrangement.

Various embodiments of the subject of the invention, with reference to which the essence of the invention will now be explained, are illustrated by way of example in the accompanying drawings, in which:

Figure 1 shows a part of an axial section on the line I—I of Figure 2 through the two last stages of a multistage radial compressor, the retardation arrangement of the last stage corresponding to Figure 2 and that of the last stage but one, as a modification of the retardation arrangement, corresponding to Figure 7, Figure 2 shows part of a section on the line II—II of Figure 1, Figure 3 shows a section on the line III—III of Figure 2, Figure 4 shows a section on the line IV—IV of Figure 2, Figure 5 shows a section on the line V—V of Figure 1, Figure 6 shows a section on the line VI—VI of Figure 1, and Figure 7 shows a section on the line VII—VII of Figure 1.

Figures 8 and 9 show sections through two further embodiments of retardation passages, and Figures 10, 11 and 12 show a retardation arrangement suitable more especially for a deflection of the conveyed medium into a following compressor stage, Figure 10 being a section on the line X—X of Figure 11 through the compressor axis, Figure 11 a section on the line XI—XI of Figure 10, and Figure 12 a section on the line XII—XII of Figure 11.

Reference will first be made to Figures 1 to 7. In these figures, 1 is the last impeller but one and 2 the last impeller of a multi-stage radial compressor conveying a medium in the direction of the arrows A. These impellers 1 and 2 rotate in the direction of the arrow B of Figure 2. Associated with each compressor stage is a passage body circumferentially surrounding the impeller of the stage in question. The passage body associated with the impeller 1 is designated by 3 and that associated with the impeller 2 is designated by 4. These passage bodies 3 and 4 are formed in two parts, the plane of separation preferably lying in the horizontal plane extending through the axis of the compressor. 5, 6 and 7 are partitions. The partitions 5 and 7 and the passage body 4 extend by means of stepped portions $5^1$, $7^1$ and $4^1$ into the compressor housing 8, which is subdivided into two halves in the circumferential direction. The steps $4^1$ of the passage body 4 assist in preventing the parts of the housing 8, which define a spiral collecting chamber 9, from coming apart in the direction of the compressor axis, since the passage body 4 takes up a tensile stress to be transmitted by the compressor housing 8 by which it is enclosed.

A large number of passages 10, 11 are provided in the passage bodies 3 and 4, in which passages the conveyed medium flowing through undergoes a retardation with optimum degree of energy conversion, by reason of the special configuration of these passages. This special configuration resides on the one hand in that the inlet cross-sections $10^1$ (Figure 7) and $11^1$ (Figure 3) of the passages 10 and 11 respectively have at least approximately circular form and have an area which is smaller than twice the area of the square formed with the internal outlet widths $a^1$ and $a^2$ (Figure 1) respectively of the passages of the impellers 1 and 2 respectively. A further feature of the aforesaid special configuration resides in that the pitch $t$ (Figure 2) on the inlet circle of the retardation passages 10 and 11 amounts at the most to three times the said internal outlet widths $a^1$ and $a^2$ respectively, and the cross-sectional outlet areas $10^2$ (Figure 7) and $11^2$ (Figure 4) respectively of the individual retardation passages 10 and 11 amount to at least three times their cross-sectional inlet areas $10^1$ and $11^1$. The passages 10 and 11 widening in the direction of flow are differently fashioned from one another in that the axis of the passages 11 is curved and the cross-section changes, from the point at which the flow enters to the point at which it leaves, from an approximately circular form (Figure 3) to an ellipse-like form (Figure 4). The larger axis $c$ of this ellipse-like form is here perpendicular to the plane of curvature and the ratio which it bears to the smaller axis $b$ exceeds by at least the value one the ratio of the total deflection angle $\alpha$ (Figure 2) to a right angle.

As is shown more especially in Figure 7, the passages 10 have, on the other hand, the form of a circular cone having a straight axis, which, if it were extended towards the apex, would have at the point of intersection of its axis with the external circumference $1^1$ a diameter $d$ smaller than the internal outlet width $a^1$ of the impeller 1.

On the inlet side of the passages 10 and 11, those walls of the bodies 3 and 4 respectively which lie between the individual passages are preferably so sharpened that no impacts can be produced by the flowing medium on these walls at the inlet.

The retardation passages can consequently, in principle, be straight or curved. In the case of straight passages, the retention of the circular or approximately circular form of the cross-section from the beginning to the end of the individual passage is favourable. In the case of a passage having a straight axis, however, the angle which the flow encloses with the radius is smaller in the course of the flow. However, if next to the outlet of the passages is arranged an annular or spiral collecting passage, it may be desirable to deflect the flow more into the tangential direction. In this case, it is advantageous to make the cross-section gradually merge from an approximately circular form at the inlet into a flattened (ellipse-like) form, and at the same time to ensure that the larger axis of the ellipse-like form is perpendicular to the plane of curvature. In such cases, it is preferable to flatten the cross-section the more, that is, to make the ratio of the larger axis to the smaller axis of this ellipse-like form greater, as the angle of deflection $\alpha$ (Figure 2) of the flow from its initial direction is greater.

From the viewpoint of manufacture, it may be favourable to give the ellipse-like cross-section of the retardation passages the form of a rectangle with corners rounded off by arcs of a circle. In this case, the radii of these arcs of a circle may expediently be equal to the radius of the circular inlet cross-section of the passage. This affords the advantage that the passages, despite the transition into a flattened form, can be produced by means of a milling tool having a single radius of curvature provided that the individual passages are divided by a cut extending through the axis of the passage.

The passage form having no curvature which is shown in Figure 7 makes it possible to reduce the mean velocity of flow considerably over a short distance, so that it is possible in some cases to dispense with the deflection of the flow in the passages, since any impulse losses have little effect in view of the comparatively low outlet velocity. Straight construction of the retarding passages renders the workshop production thereof comparatively simple. In such cases, the passages may be bored out conically from a solid piece, it even being possible with the passage form shown in Figure 7 to produce passages of different sizes with the same conical working tool, which would then merely have to be introduced into the passage to a varying distance.

Even in the case of retardation passages having straight axes, it may be desirable, in order that their cross-sectional outlet area may be better adapted to an annular collecting passage, to make the circular internal inlet cross-section 20 merge approximately into a square cross-section 21 with rounded corners in the direction of flow as far as the outlet, in the manner shown in Figure 8. Such corners may be rounded off by arcs of a circle, the radii of which are equal to the radius of the circular inlet cross-section 20.

At the inlet end of the retardation passages, the cross-sectional area of flow, as seen in the radial direction, is narrowed owing to the partitions between the passages. It is therefore preferable to compensate for this narrowing by a corresponding reduction of the angle of flow $\beta$ (Figure 2) with respect to the radius, that is to say to make the angle $\beta$, which the axis of each widening passage 11 encloses at its inlet with the radial direction (referred to the axis of the compressor), smaller than the angle $\gamma$, which the direction of the absolute velocity $w$ of the flow encloses at the outlet from the impeller 2 with the radial direction.

At the outlet end of the retardation passages, impact flow losses can be reduced by making the thickness of the partition between two adjacent passages as small as possible and also not thicker at the outlet end than at the inlet end.

As is shown in Figure 1, conditions are not quite the same at the outlet end of the passage bodies 3 and 4 in that the component flows issuing from the passages 10 of the body 3 must be deflected into the following compressor stage, while the component flows issuing from the passages 11 of the body 4 pass directly into the spiral collecting chamber 9. In both cases, the passages 10 and 11 are separated by partitions in the manner shown in Figure 1, and with regard to the passages 10 also in Figure 5, the said partitions constitute a more or less large part of the total cross-section according to the form of the retardation passages. After the flow has left the passages 10 and 11, the flow cross-section consequently increases suddenly. It is therefore preferable, as shown in Figure 1, to arrange next to the outlet of the passages 10 a collecting passage 12 having a nozzle-like constriction 13 and so to design the arrangement that a cylindrical section VI—VI taken at the narrowest point of this collecting passage 12 coaxially in relation to the axis of the compressor gives in respect of each passage 10 an area *m*—*n*—*o*—*p* (Figure 6) which is at the most equal to the free area of throughflow of a corresponding section (Figure 5) directly before the flow leaves the passage 10.

On the other hand, with regard to the passages 11 provided in the passage body 4, which are directly adjoined by the spiral collecting passage 9, it is preferable in order to obtain a uniform flow over its entire periphery, so to dimension the internal cross-sectional course of this passage 9 that the rotational velocity of the flow is constant and equal to the rotational velocity of the flow at the outlet from the individual passages 11. Referred to the radii $r$ and $r_1$ and tangential velocity components $u$ and $u_1$ shown in Figure 2, this means that $r.u = r_1.u_1$, $r$ and $u$ relating to any desired point of the spiral collecting passage 9, while $r_1$ and $u_1$ relate to the outlet cross-section of the passages 11.

If, on the other hand, after leaving one compressor stage the flow is to be introduced into a following compressor stage without any inlet rotational velocity, it is possible, after the flow has left, for example, rectilinear retardation passages according to Figures 7 or 8, to guide it first through an unbladed collecting passage (for example 12 in Figure 1), while retaining the rotational velocity, substantially in a direction towards the axis and to eliminate the rotational velocity only after this deflection by a blading having a relatively small deflection angle arranged in the return passage 14 (Figure 1). The deflection angle required for this blading can be reduced when the width of the collecting passage 12 is progressively reduced in the direction of the deflection.

Alternatively, the flow can first be outwardly guided in the radial direction in widening retardation passages 15 (Figure 9), in which case the deflection has subsequently only to take place inwardly in the radial direction without rotational velocity in an adjoining collecting passage. In this case, an ellipse-like form must gradually be imparted to the internal cross-section of the retardation passages towards the outlet end.

In cases where the flow has to be deflected into a following compressor stage, the construction may also be such, as shown in Figures 10, 11 and 12, that the flow is deflected within the retardation passages 16 into the direction of the compressor axis 17 (Figure 11), that is, in the direction of the arrow 18 in Figures 10 and 12, and is thereafter guided radially inwards towards the compressor axis 17 without retardation in a collecting passage 19, in which case the cross-section of the passage preferably merges into an ellipse-like form 22 (Figure 11) in the deflection.

An arrangement according to the invention may be provided both in radial centrifugal compressors and in radial centrifugal pumps.

What is claimed is:

1. A centrifugal engine for use as a compressor or pump comprising at least one impeller with blades defining substantially radial passages; a casing containing said impeller and comprising walls defining a passage through which a medium flows to said impeller; a passage body associated with said impeller and circumferentially surrounding it, said passage body comprising retardation passages arranged next to the impeller and widening in the direction of flow and having each an inlet cross-section of at least approximately circular form and of an area which is smaller than twice the area of the square formed with the internal axial outlet width of the associated impeller passages, and the pitch on the inlet circle of said retardation passages being at the most three times the internal axial outlet width of said impeller passages, and the outlet cross-section of each retardation passage being at least three times its inlet cross-section, said casing comprising also walls defining a collecting passage for the medium issuing from said retardation passages.

2. The combination defined in claim 1 in which the individual retardation passages are curved and the cross-sections of these passages taken on planes perpendicular to the axis of the passage change progressively from the inlet to the outlet of the flow, from approximately circular form into an ellipse-like form, the larger axis of which is perpendicular to the plane of curvature and bears to the smaller axis a ratio which exceeds by at least the value one the ratio of the total deflection angle to a right-angle.

3. The combination defined in claim 1 in which the individual retardation passages are curved and the cross-sections of these passages taken on planes perpendicular to the axis of the passage change progressively from the inlet to the outlet of the flow, from approximately circular form into the form of a rectangle with corners rounded off by arcs of a circle, the radii of these arcs of a circle being equal to the radius of the circular inlet cross-section.

4. The combination defined in claim 1 in which the retardation passages widening in the direction of flow have the form of a right circular cone, which cone, if extended to the apex, would have at the point of intersection of its axis with the outer circumference of the associated impeller a diameter smaller than the internal outlet width of this impeller.

5. The combination defined in claim 1 in which the retardation passages widening in the direction of flow have a rectilinear axis and the cross-section of each of these passages taken on planes perpendicular to said axis changes progressively in the direction of flow to the outlet approximately into a square having corners rounded off by arcs of a circle, the radii of these arcs of a circle approximating the radius of the circular inlet cross-section.

6. The combination defined in claim 1 in which the angle which the axis of the widening retardation passages encloses at its inlet with the radial direction (referred to the axis of the centrifugal engine), is smaller than the angle which the direction of the absolute velocity of the flow at the outlet from the impeller encloses with the radial direction.

7. The combination defined in claim 1 in which the thickness of the partition between two adjacent retardation passages at the inlet and outlet ends of the passages is equal.

8. The combination defined in claim 1 in which the collecting passage narrowing in the form of a nozzle adjoins the outlet of the widening retardation passages, a cylindrical section taken at the narrowest point of this collecting passage coaxially in relation to the compressor axis giving an area which is at the most equal to the free through-flow area of a corresponding section directly before the outlet from the retardation passages.

9. The combination defined in claim 1 in which the outlet of the widening retardation passages is adjoined by a spiral collecting chamber, the cross-sectional course of which is so dimensioned that the rotational velocity of the flow in the collecting chamber is constant and equal to the rotational velocity of the flow at the outlet from the individual retardation passages.

10. A centrifugal multi-stage compressor or pump comprising impellers with blades defining substantially radial passages; a casing containing said impellers and comprising walls defining a passage through which a medium flows to the impeller of the first stage; partitions located between the different impellers and fixed by means of said casing, walls of said partitions confining passages for guiding the flow from one stage to the following one; passage bodies associated with said impellers and each circumferentially surrounding the associated impeller, these passage bodies comprising retardation passages arranged next to the associated impeller and widening in the direction of flow and having each an inlet cross-section of at least approximately circular form and of an area which is smaller than twice the area of the square formed with the internal axial outlet width of the associated impeller passages, and the pitch on the inlet circle of said retardation passages being at the most three times the internal axial outlet width of said impeller passages, and the outlet cross-section of each retardation passage being at least three times its inlet cross-section, said casing comprising also walls defining collecting passages for the medium issuing from the retardation passages of the different stages; and unbladed collecting passage in each of said partitions, with exception of that associated with the last stage, the flow leaving the retardation passages of a stage being first guided by said unbladed passages substantially in a direction towards the axis, the rotational velocity of the flow being retained; and bladings arranged in said guide passages of the partitions, these bladings being so designed as to eliminate said rotational velocity of the flow that has issued from said unbladed passages; said casing confining also a spiral collecting passage directly adjoining the outlet of the retardation passages of the last stage.

11. The combination as claimed in claim 10 in which the width of the unbladed collecting passages is progressively reduced in the direction of the deflection of the flow.

12. A centrifugal multi-stage compressor or pump comprising impellers with blades defining substantially radial passages; a casing containing said impellers and comprising walls defining a passage through which a medium flows to the impeller of the first stage; partitions located between the different impellers and fixed by means of said casing, walls of said partitions confining passages for guiding the flow from one stage to the following one; passage bodies associated with said impellers and each circumferentially surrounding the associated impeller, these passage bodies comprising retardation passages arranged next to the associated impeller and widening in the direction of flow and having each an inlet cross-section of at least approximately circular form and of an area which is smaller than twice the area of the square formed with the internal axial outlet width of the associated impeller passages, and the pitch on the inlet circle of said retardation passages being at the most three times the internal axial outlet width of said impeller passages, and the outlet cross-section of each retardation passage being at least three times its inlet cross-section, said widening retardation passages guiding the flow at first outwardly in the radial direction and said casing comprising also walls defining collecting passages for the medium issuing from the retardation passages of the different stages; these collecting passages guiding the flow radially inwards without rotational velocity; said casing confining also a spiral collecting passage directly adjoining the outlet of the retardation passages of the last stage.

13. A centrifugal multi-stage compressor or pump comprising impellers with blades defining substantially radial passages, said impellers having a common axis of rotation; a casing containing said impellers and comprising walls defining a passage through which a medium flows to the impeller of the first stage; partitions located between the different impellers and fixed by means of said casing, walls of said partitions confining passages for guiding the flow from one stage to the following one; passage bodies associated with said impellers and each circumferentially surrounding the associated impeller, these passage bodies comprising retardation passages arranged next to the associated impeller and widening in the direction of flow and having each an inlet cross-section of at least approximately circular form and of an area which is smaller than twice the area of the square formed with the internal axial outlet width of the associated impeller passages, and the pitch on the inlet circle of said retardation passages being at the most three times the internal axial outlet width of said impeller passages, and the outlet cross-section of each retardation passage being at least three times its inlet cross-section, the flow being deflected within said retarding passages in the direction of the axis of rotation of the impellers and thereafter guided in passages provided in said partitions radially inwards towards said axis without retardation; said casing confining also a spiral collecting passage directly adjoining the outlet of the retardation passages of the last stage.

References Cited in the file of this patent

UNITED STATES PATENTS

| | | |
|---|---|---|
| 958,765 | Prindle | May 24, 1910 |
| 984,189 | Brown | Feb. 14, 1911 |
| 1,917,029 | Good | July 4, 1933 |
| 2,311,024 | Buchi | Feb. 16, 1943 |

FOREIGN PATENTS

| | | |
|---|---|---|
| 170,815 | Great Britain | Oct. 14, 1921 |
| 273,804 | Great Britain | July 7, 1927 |
| 336,840 | Great Britain | Oct. 23, 1930 |
| 604,378 | Great Britain | July 2, 1948 |
| 627,072 | Great Britain | July 27, 1949 |
| 709,266 | Germany | Aug. 12, 1941 |